United States Patent
Ryu et al.

(10) Patent No.: US 6,290,811 B1
(45) Date of Patent: Sep. 18, 2001

(54) METHOD FOR RECYCLING OF OLD CORRUGATED CONTAINER USING FLOTATION AND KNEADING TREATMENT

(75) Inventors: Jeong Yong Ryu, Daejeon; Kyoung Rak Ji, Choongchungbook-do; Jong-Ho Shin; Say Kyoun Ow, both of Daejeon, all of (KR)

(73) Assignee: Korea Research Institute of Chemical Technology (KR)

( * ) Notice: Subject to any disclaimer, the term of this patent is extended or adjusted under 35 U.S.C. 154(b) by 0 days.

(21) Appl. No.: 09/339,819

(22) Filed: Jun. 25, 1999

(30) Foreign Application Priority Data

Jun. 27, 1998 (KR) .................................................. 98-24526

(51) Int. Cl.⁷ ............................... D21C 5/02; D21B 1/34
(52) U.S. Cl. .................................. 162/4; 162/55; 162/56; 162/189; 209/164
(58) Field of Search .................................. 162/4, 189, 55, 162/56; 209/164

(56) References Cited

U.S. PATENT DOCUMENTS

| | | | |
|---|---|---|---|
| 4,399,028 | * | 8/1983 | Kile et al. . |
| 4,872,953 | * | 10/1989 | Smith . |
| 5,316,621 | * | 5/1994 | Kitao et al. . |
| 5,348,620 | * | 9/1994 | Hermans et al. . |
| 5,390,860 | * | 2/1995 | Ali et al. . |
| 5,501,768 | * | 3/1996 | Hermans et al. . |
| 5,686,262 | * | 11/1997 | Fink et al. . |
| 5,958,179 | * | 9/1999 | Gehr et al. . |

FOREIGN PATENT DOCUMENTS

802275 * 10/1997 (EP) .

OTHER PUBLICATIONS

Pulp & Paper, Bliss, T., 88, 104 (1987).
Tappi; Clark, L.E., and Iannazzi F.D., 57, 59 (1974).
Pulp & Paper International, 39, 65 (1997).

* cited by examiner

Primary Examiner—Thomas M. Lithgow
(74) Attorney, Agent, or Firm—Finnegan, Henderson, Farabow, Garrett & Dunner, L.L.P.

(57) ABSTRACT

The present invention relates to a method for recycling of old corrugated container (OCC) using flotation and kneading treatment and more particularly, to a method for recycling of OCC, wherein OCC is treated withflotation and kneading, treatment, and thereby removing fines and ink spot in the waste pulp and improving the strength and drainage property. As a result, it can be recycled similar to the expensive virgin unbleached kraft pulp.

4 Claims, No Drawings

METHOD FOR RECYCLING OF OLD CORRUGATED CONTAINER USING FLOTATION AND KNEADING TREATMENT

BACKGROUND OF THE INVENTION

1. Field of the Invention

The present invention relates to a method for recycling of old corrugated container (OCC) using flotation and kneading treatment and more particularly, to a method for recycling of OCC, wherein OCC is treated with flotation and kneading treatment, and thereby removing fines and ink spots in the recycled pulp and improving the strength and drainage properties. As a result, it can be recycled similar to the expensive virgin unbleached kraft pulp.

2. Description of the Prior Art

The total paper production of Republic of Korea amounted to 8 million tons in 1997, and hence Korea became one of the top 10 largest production countries in the world. The production of the base paper for corrugated board essential for packaging goods accounts for more than 30% of the total paper production. Corrugated board used for packaging of goods, plays an important role in transfer and protection of goods, and improves the value of goods. So, it is an important packaging paper in the aspect of strength and appearance both. The base paper of corrugated board is; mainly manufactured from Korean old corrugated container (KOCC), and thus the recycling rate of KOCC is very high. However, KOCC used as main source material for the manufacture of corrugated board is already printed. Also, various printed matters other than corrugated board are contained in the waste paper, and since deinking has not been performed in the previous recycling process, the accumulation of ink is deepened as the recycling is repeated. Accordingly, since there remained ink spots cannot be removed by dyeing treatment in the recycling procedure, the base paper of the recycled corrugated board are distinguished apparently from the high-quality base paper of corrugated board, composed of unbleached kraft pulp, without spots.

The recycled pulp of OCC has the disadvantage of deteriorated appearance due to ink spots and poor drainage in papermaking and weak strength due to the high fines content. Currently used KOCC has the fines content more than half of the total paper compositions because of the repeated recycling treatments. And, the formation of fines is accelerated much more due to the hornification of fiber as the recycling treatment is repeated. Generally, fines refer to inorganic materials and fine fibers smaller than 75 $\mu$m, and they have been the main cause of the declination of productivity because they interfere draining of wet web in papermaking of the base paper.

However, the problem of drainage deterioration in papermaking due to the fines could not be settled by the conventional recycling treatment technique using KOCC as main source material. In addition, it was impossible to pulverize mechanically the said ink spots because the drainage deterioration due to the formation of fines hindered the sufficient treatment of hornified OCC pulp.

Although the technology comprising cleaning OCC with screen or cleaner, fractionating of long and short fiber portions, and improving the paper strength bad selectively disintegrating the long fiber portions, has been applied in developed countries [Bliss T., *Pulp and Paper*, 88, 104 (1987); Clark L. E. and Iannazzi F. D., *Tappi*, 57, 59 (1974)], the said technology is only suitable for high quality OCC comprising good quality of unbleached kraft pulp and neutral sulfite semichemical pulp. The strength of the base paper of the corrugated board can not be improved, in case low-quality OCC, having more fines content than long fiber portions, is used for main material of the corrugated board, as in Korea.

For this reason, high-quality base paper for corrugated board with excellent: strength and without spots has been imported until now, and recently the imported amount of high quality base paper of corrugated board has increased rapidly from166,000 tons in 1995 to 193,000 tons in 1996 with the improvement of standard of living [Pulp & Paper International, 39, 65 (1997)]. As mentioned above, there was no alternative other than using 100%-imported unbleached kraft pulp as source material, and KOCC could not be used with the conventional technology. Actually, in 1996, the total quantity of unbleached kraft pulp imported for the manufacture of kraft paper and various corrugated board amounted to 270,000 tons [Pulp & Paper International, 39, 65 (1997)]. Accordingly, there is a serious demand for the development of new technology which improves the productivity, enhances the strength, removes ink spots in OCC, and reproduces to high-quality corrugated board by improving the drainage property of KOCC with high fines content.

SUMMARY OF THE INVENTION

As a result of earnest efforts to solve the said problems, the present invention was accomplished by confirming that the flexibility of fiber is improved and the ink spots are removed effectively without deteriorating the drainage of the base paper of OCC pulp, when the large quantity of inks and fines contained in OCC are separated effectively with the flotation treatment, and the long fiber portions and ink spots are treated with kneading treatment.

Accordingly, an object of this invention is to provide a method for recycling OCC which can substitute OCC for virgin unbleached kraft pulp used for the high-quality base paper of corrugated board by removing fines, ink spots, dusts, etc.

DETAILED DESCRIPTION OF THE INVENTION

The present invention is a method for recycling OCC, wherein fines and inks are separated with the flotation treatment of OCC and then the same is treated with kneading treatment.

Hereunder is given a detailed explanation of each process of the present invention.

This invention is highly characterized by using flotation treatment applied previously in the deinking process of printed matter for separation of inks and fines of OCC.

The flotation treatment in a deinking process is conducted in order to separate the ink particles with different size and surface chemical properties from the stock. Although various kinds of deinking agents must be added for this flotation in deinking process to decrease the floating of wood fiber and promote desorption of ink particles and formation and stabilization of foams, the flotation process for OCC according to the present invention is fundamentally different from the flotation in a deinking process, in that it removes inks and it is conducted for the separation purpose only on the basis of size of fibers which have the same surface chemical property without using any chemical additives under relative low flow rate and air mixing condition. This is the excellence of the present invention.

The flotation treatment according to the present invention is carried out preferably under the condition of 0.5–2.0% OCC concentration, a temperature range of 40–70° C., a flow rate of 18–24 L/cm$^2$/min, and an air mixing ration of 0.1–0.2 L/stock: L, and inks and fines cannot be separated effectively if the flotation treatment is carried out outside the above limiting ranges.

Subsequently, the kneading treatment process is performed in order to pulverize remaining ink spots larger than 200 μm which are not yet removed from the separated long fiber portion. It is desirable to perform the kneading treatment at the stock concentration of 15–30% and at the temperature of 60–90° C. If the temperature is lower than 60° C., the kneading treatment results in the formation of fines and induces the drainage load. The said kneading treatment may be treated just once, however the remaining ink spots can be removed effectively by conducting the treatment several times, preferably 2–5 times.

When the kneading treatment is conducted without flotation treatment, the drainage time of the kneaded stock increased rapidly, and thus sufficient mechanical treatment becomes impossible. However, if the flotation treatment is preceded according to the present invention, not only various strength properties but also drainage is improved after the kneading treatment.

As explained above, the present invention is especially useful for the recycling of KOCC, because 1) effective removal of ink spots and dusts are possible by the kneading treatment followed by the separation of inks and fines after the flotation treatment in a specific condition, and 2) various strength properties such as compression strength and burst strength can be highly improved without changing drainage of OCC pulp in performing various mechanical treatment.

The following specific examples are intended to be illustrative of the invention and should not be construed as limiting the scope of this invention as defined by the appended claims.

EXAMPLE 1

The recycled stock for surface linerboard was sampled in valveless filter, and then was diluted to concentration of 1% with water. The reject fraction was separated by flotation treatment for 2 minutes at 45° C. under flow rate of 21 L/cm$^2$/min and air mixing ratio of 1.5 L/stock L using E-type laboratory flotation cell (Voith Co., Germany). Subsequently, 17% of the reject was separated by 2-minute flotation.

EXAMPLE 2

With the same method as in Example 1, however concentrating the flotation accept again to 25%, the same was kneaded once with a kneader (Yamamoto Machinery Co., Ltd., Japan) at 70° C. The kneaded stock was diluted to 1% of concentration with white water withdrawn from the concentration process, and disintegrated completely at 2,300 rpm for 10 mins.

EXAMPLE 3

With the same method as in Example 2, however the kneading treatment was performed for 3 times.

COMPARATIVE EXAMPLE 1

With the same method as in Example 1, however the flotation treatment was omitted.

COMPARATIVE EXAMPLE 2

With the same method as in Example 2, however the flotation treatment was omitted and only the kneading treatment was performed.

EXPERIMENTAL EXAMPLE

The stock prepared by the Examples 1–3 and Comparative examples 1–2 was handsheeted with a basis weight of 150 g/m$^2$ according to TAPPI Standard Test Method T-205 om-88, and the time required for draining was measured. The burst strength, compression strength and folding endurance of the handsheet were measured respectively with TAPPI Standard Test Method T-403 om-85, T-818 om-87 and T-220 om-83. The spots in the handsheet were measured using BMI Plus (BumMi Universe Co.), an image-analyzing program, at a gray scale of 255 and a resolution of 300 dpi. The ash content was measured by setting the temperature of Muffle furnace to 400° C. for 24 hours in order to avoid the ignition loss of the inorganic materials. The results are given in Table 1.

TABLE 1

| Section | Example | | | Comparative | |
| --- | --- | --- | --- | --- | --- |
|  | 1 | 2 | 3 | 1 | 2 |
| Drainage time (s) | 31.89 | 23.30 | 32.36 | 38.59 | 67.11 |
| Compression strength (N) | 123.46 | 136.04 | 123.67 | 106.54 | 115.50 |
| Bursting strength (kPa · m$^2$/g) | 1.76 | 2.99 | 3.01 | 1.54 | 2.02 |
| Folding Endurance (No.) | 10.8 | 18.8 | 18.0 | 9.8 | 18.8 |
| Number of spots (No./10 cm$^2$) | 300 | 159 | 66 | 467 | 172 |
| Spot area (ppm) | 17.36 | 8.75 | 3.08 | 26.65 | 9.19 |
| Ash content (%) | 8.69 | 8.69 | 8.69 | 12.15 | 12.15 |

As can be confirmed in Table 1, the flotation treatment of KOCC reduced the drainage time by more than 17% and increased various strengths by 10–15%. This is because the fines that hinders drainage and are detrimental to the strength were removed. The strength was improved due to the relative increase in the long fiber proportions due to the decrease of fines.

In addition, the ash content of Example 1 was lower than that of Comparative example 1, wherein no flotation was performed, by 28.5%. More than 30% of the reject removed by the flotation treatment was identified to be organic materials, There strength was increased since the said ash content, which hinders the hydrogen bond generally giving the strength of paper, was reduced by flotation.

On the other hand, as can be seen from the spot number and spot area of handsheet in Example 1, the ink spots could not be removed effectively with the flotation treatment only. Also as can be seen from the measurements of Example 2, Example 3 and Comparative example 2, the spot number and spot area decreased when the kneading treatment was performed for pulverization of the ink spots. Especially, the kneading treatment was performed 3 times after the flotation treatment (Example 3), spot number and spot area exhibited the minimum value.

As can be confirmed in Table 1, the burst strength measurements of Example 2 & 3 were improved compared with those of Comparative example 1 & 2 by more than 94%. It shows that when the flotation pretreatment precedes the kneading treatment, there was a synergistic effect of removing the fines and prominently improving the mechanical strength. However, if the kneading treatment is performed without the flotation treatment, the drainage time increases rapidly and it cannot be applied to the actual process.

As stated in detail and proved above, the present invention provides a recycling method of OCC using flotation treatment and kneading treatment. The recycling method of OCC of the present invention has the following advantages compared with the conventional recycling method, and thus the unbleached kraft pulp used for the manufacture of base paper of high-quality corrugated board:

The finesand ink spots are removed effectively;

The drainage property and various strength properties are improved; and

The productivity of the base paper of corrugated board is improved.

What is claimed is:

1. A method for recycling of old corrugated container (OCC), comprising separating from the OCC fines and ink with a flotation treatment to prepare a separated OCC; and subjecting the separated OCC to a kneading treatment.

2. The method for recycling of OCC according to claim 1, wherein the said flotation treatment is conducted under the condition of 0.5–2.0 OCC concentration, temperature of 40–70° C., flow rate of 18–24 L/cm$^2$/min and air mixing ratio of 0.1–0.2 L/stock L.

3. The method for recycling of OCC according to claim 1, wherein the said kneading treatment is conducted under the condition of 15–30% stock concentration and temperature of 60–90° C.

4. The method according to claim 1, wherein the separating step comprises a fiber size based separation.

* * * * *